United States Patent Office 3,435,943
Patented Apr. 1, 1969

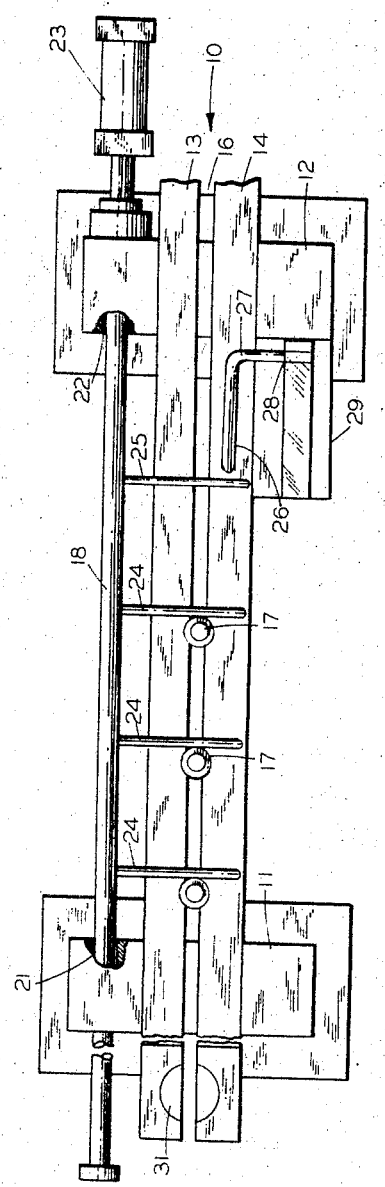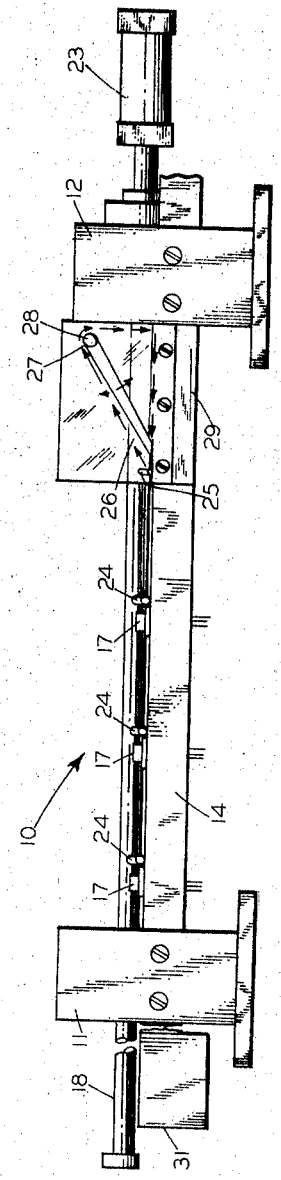

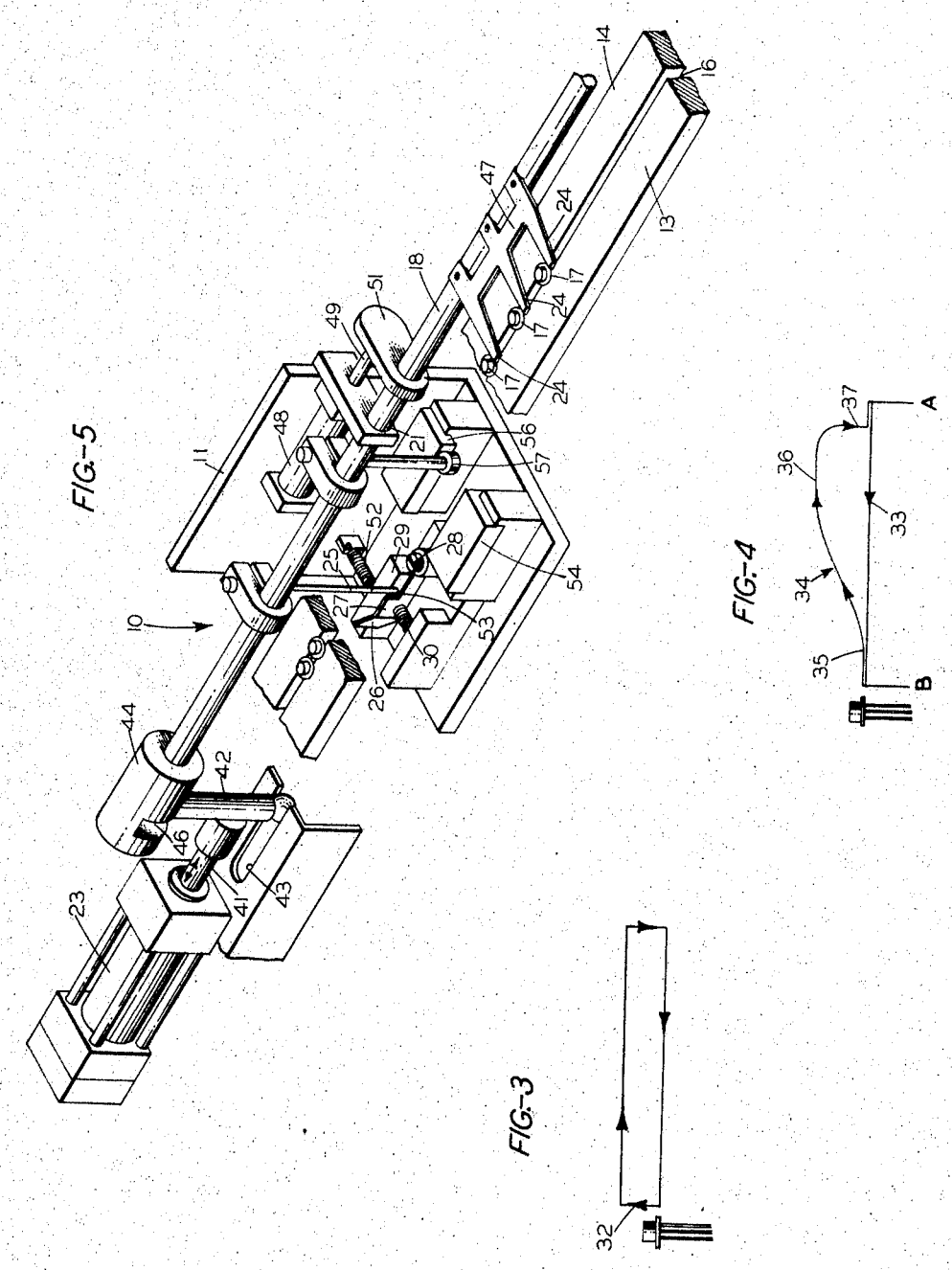

3,435,943
METHODS OF AND APPARATUS FOR INDEXING ARTICLES
Anderson F. Johnson, Jr., Sinking Spring, Pa., assignor to Western Electric Company, Incorporated, New York, N.Y., a corporation of New York
Filed Aug. 2, 1967, Ser. No. 657,862
Int. Cl. B65g 25/08
U.S. Cl. 198—221                                10 Claims

ABSTRACT OF THE DISCLOSURE

An indexing mechanism for feeding a plurality of articles such as semiconductor headers includes a guideway for the articles; and a rod, mounted for axial and rotary movement, having a plurality of arms extending therefrom for engaging the individual articles. A guide member is pivotably mounted at an incline to the path of axial movement of one of the extended arms. The rod is reciprocated to move the latter named guide arm during a return stroke of the rod along the incline of the guide member to rotate the feed arms out of engagement with the articles, and then behind the inclined guide member, whereafter during the forward stroke of the rod the arm engages and advances past the pivoting guide member while all the feed arms engage and advance the articles.

Background of the invention

This invention relates generally to methods of and apparatus for indexing articles along a path and more particularly to the intermittently feeding of semiconductor headers in a spaced relation.

In the past, it was common to feed a series of articles, using a plurality of spaced fingers, by moving the fingers a fixed distance along the path of movement for the articles, raising the fingers out of engagement therewith, returning the fingers the fixed distance, and lowering the fingers into interspersed relation with the articles, in a repetitive manner.

Such a system for feeding odd shaped articles, especially semiconductor headers having flanged surfaces, is undesirable because an article being fed may be cocked upon the raising of a finger. The cocking of an article is undesirable since jamming may occur, causing a loss of machine time and requiring an operator to correct the condition.

Summary of the invention

It is an object of this invention to provide new and improved methods and apparatus for intermittently feeding articles without the occurrence of a cocked article upon the return stroke of the feed mechanism.

Another object of the invention is to provide novel methods and apparatus for advancing a series of articles using a plurality of feed fingers affixed to a common rod having a guide finger attached thereto and, following the advancing, reversing the direction of the fingers prior to the riding of the guide finger along a pivotably mounted inclined guide member to prepare the feed fingers for indexing subsequent articles.

Yet another object of the invention is to provide novel methods and apparatus for feeding articles using a rod having feed fingers extending therefrom for engaging and feeding the articles, wherein linear and rotary motion only are applied to the rod, obviating any necessity for transverse motion to the rod.

With these and other objects in view, the present invention contemplates a new and improved system for feeding a plurality of articles, such as spaced apart semiconductor headers, that rest upon a divided track to a nest located in alignment with the track, comprising a rod mounted parallel to the track for reciprocative and rotative movement. The rod has a plurality of fingers extending therefrom, and an arm mounted thereon. A pivotably mounted inclined lever is arranged so that, upon the return stroke of the rod, the arm contacts and rides along the inclined lever, causing an upward camming of the rod and an upward tilting of the fingers so that each of the fingers is raised above individual upstream located headers. The length of the lever is less than the strokes of the rod and less than the distance between like surfaces of adjacent headers so that, prior to the termination of the return stroke, the arm rides off the lever and permits the individual fingers to drop behind individual spaced apart headers. Then, upon the subsequent forward stroke of the rod, the lever pivots to permit the movement of the arm thereunder while the fingers incrementally advance the headers, one of the fingers pushing its associated header into the nest.

Generally, articles are fed along a supporting guideway by a comb-like structure which reciprocates along the forward direction of the guideway a fixed distance, from a starting point, corresponding to the distance between the lagging surfaces of adjacent articles, the teeth of the structure engaging and advancing the articles. The structure, then, is reversed in movement for a short distance, and, continuing its reversal, a "guide" tooth of the structure is raised upwardly along a pivotable inclined guide member, rotating the structure through a positive angle to bring the teeth of the structure out of engagement with the articles. As the tooth passes behind the guide member, the structure rotates through a like negative angle, the structure continuing to the starting point with its teeth interleaved with the articles. As the structure again reciprocates in the forward direction, the guide tooth passes under and pivots the guide member.

Brief description of the drawings

Other objects and advantages of the present invention will appear upon consideration of the following detailed description of specific embodiments, in conjunction with the accompanying drawings, wherein:

FIG. 1 is a plan view of one embodiment of this invention;

FIG. 2 is a side view thereof;

FIG. 3 is a locus diagram of a feed finger for a prior art feeding mechanism;

FIG. 4 is a locus diagram of a feed finger for one embodiment of the subject invention;

FIG. 5 is a perspective cutaway view of another embodiment of this invention.

Detailed description

Figure 6A:
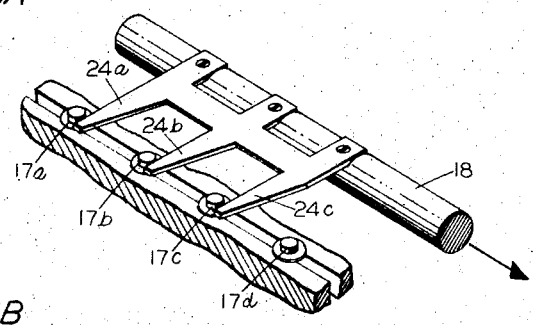
FIGS. 6A through 6D are a set of illustrations depicting the operation of the fingers upon the headers in accordance with this invention.

Referring to FIGS. 1 and 2, there is illustrated an indexing mechanism 10 including a pair of supports 11 and 12 for mounting a pair of parallel spaced apart tracks 13 and 14. The spaced apart tracks 13 and 14 define a guideway 16 therebetween for receiving a plurality of articles such as multiterminal semiconductor headers 17—17 for advancement from right (upstream) to left (downstream) as viewed in the drawings.

A rod 18, mounted within bearings 21–22 of the supports 11 and 12, respectively, is driven by a suitable means, such as an air cylinder 23, in the direction along its longitudinal axis parallel to the guideway 16. The rod 18 mounts a plurality of individual fingers 24—24 which are designed to advance corresponding individual articles 17 with the fingers resting in close proximity to the upper surface of the tracks 13 and 14. An arm 25 affixed to the rod 18 is located at the upstream end of the rod and is designed to engage, upon reversal of the rod, an inclined surface 26 of a lever 27. A shaft 28 is fixed to the upper end of the lever 27, and is pivotally mounted on a support block 29 for pivoting about the horizontal axis of the shaft.

The normal position of the lever 27 is shown in the drawings, in which the lever is fully pivoted in a counter-clockwise direction (FIG. 2) due to its weight, with the lower end of the lever resting on the upper surface of the track 14. As depicted in the drawings, the rod 18 is at the end of its forward stroke, during which the fingers 24—24 effect incremental advance of the articles 17. Upon a return stroke, the arm 25 of the rod 18 rides up the surface 26 of the lever 27 and thereafter the arm drops off the upstream end of the lever 27 to a stop position with the arm 25 and fingers 24—24 engaging the surface of the track 14. During the movement of the arm 25 up the surface 26, the rod 18 rotates through an angle sufficient to raise the fingers 24—24 up and over succeeding individual articles 17—17. As the arm 25 reaches the peak of its upper movement, the fingers 24—24 are positioned behind the individual articles that have just been passed over. On the advance or forward stroke of the rod 18, the arm 25 passes under the lever 27 due to the lever 27 pivoting a short distance about the shaft 28, and continues to advance until the forward stroke of the rod 18 effects the incremental displacement of the articles 17—17. The articles 17—17 are successively moved into a nest 31 at the left end of the mechanism 10.

FIG. 3 shows a locus of a typical prior art finger, used for feeding articles. A finger following such a locus may, upon engagement of the flanged surface of a semiconductor header for example, cause the header to cock upon the upward movement 32 of the finger. It is noted that such movement and hence, such cocking, does not occur with the embodiments of the present invention as described hereinbelow.

FIG. 4 is a locus of a finger in accordance with one embodiment of the invention. Other similar loci utilizing different shaped curves, straight lines or combination thereof, may be suitable. Essentially, the curve of FIG. 4 includes a forward stroke 33, which traverses from a point A to a point B, the forward stroke being predominantly linear. The return stroke 34 includes first, a linear stroke 35 which retracts a short distance from the point B toward the point A, and then the arm moves upward and back along a path 36 close to the terminal point A. This path 30 can be an inclined linear path, or can be a curvilinear path as shown, for example, in FIG. 4. The arm, upon its completion of its return stroke, lowers to the original linear path and retracts back to the point A as indicated by the path 37.

Thus, prior art devices teach the immediate raising of the fingers prior to their retraction, thereby causing possible displacement of the articles to be fed. However, upon following the teachings herein, the articles, such as headers, are not cocked but are properly indexed in a smooth, coherent fashion, due to the fingers being retracted prior to being raised, thus preventing a header from being disrupted by finger raising at the termination of the advance stroke.

There has thus been described a mechanism for successively feeding a plurality of spaced apart semiconductor devices that rest upon a divided track to a nest located downstream of the track.

FIG. 5 is a perspective view, partly broken away of another embodiment for practicing the invention. For convenience, similar reference numerals are used to represent corresponding functional components as shown in FIGS. 1 and 2. The indexing mechanism 10 includes a support 11 having a bearing 21 for supporting a rod 18 so that the rod 18 can be reciprocated and rotated within the bearing 21. The rod 18 is coupled to an air cylinder 23 by means of a non-rotatable reciprocating armature 41 which is affixed to a coupling bar 42, one end of which is adapted to reciprocate within a longitudinal slot 43 formed within the support 11 to prevent the armature 41 from rotation. The other end of the bar 42 is connected to the rod 18 by a coupler 44 which has a partial circumferential slot 46 therein for engagement by the bar 42, whereby rotation of the rod 18 is not imparted by the bar 42. Thus, pure reciprocating motion by the armature 41 is communicated by the bar 42 and the coupler 44 to the rod 18. In other words, even though the armature 41 reciprocates but does not rotate, the rod 18 can have both reciprocating and rotating motion. The rod 18 has a plurality of fingers 24—24 extending transversely therefrom for engagement with articles 17—17, such as headers, which ride along a guideway 16 formed by a pair of opposed parallel tracks 13, 14. As shown in FIG. 5, a set of three fingers 24—24, for example, can be joined by a supporting cross bar 47 to give strength and rigidity to the fingers 24—24.

A shock absorbing cylinder 48 is affixed to the support 11 and has extending therefrom a reciprocating piston 49 which is coupled to a collar 51 affixed to the rod 18. The properties of the cylinder 48 are such as to act as a dashpot, thereby permitting the reciprocating piston 49 to move slowly to the left by spring action while allowing the piston 49 to move quickly to the right when the main piston 23 is actuated. Thus, the fingers 24—24 feed slowly to the left, while retracting rapidly to the right.

A downward depending arm 25 from the rod 18 is adapted to ride along the inclined surface 26 of a lever 27 which is pivoted about an axis 28 in a manner similar to that described in connection with the embodiment of FIGS. 1 and 2. The arm 25 moves forward, to the left, along a relatively straight path guided in part by a flat surface along a support block 29. As the arm 25 advances, it pivots and disengages from the lever 27. Upon retraction, the arm 25 rides along the inclined surface 26 causing the rod 18 to rotate, lifting the fingers 24—24. At the rear of the stroke, a spring 52 urges the arm 25 to ride off the lever 27 at a cut out portion 53 thereof toward the vertical. The lever 27 is attracted to the block 29 by a spring 30 or, if applicable by gravity.

The overall height, to which the fingers 24—24 can be raised, can be varied through the use of an auxiliary depending arm 57 coupled to the rod 18, which arm rides between adjustable guide plates 54, 56 affixed to the support 11.

FIGS. 6A–D illustrate a sequence of operation for the rod 18 and fingers 24a, 24b, 24c. As shown in FIG. 6A, the fingers 24a, 24b, 24c are at the lagging surfaces of transistor headers 17a, 17b, 17c. FIG. 6A illustrates the rod 18 moving toward the right disengaging the fingers 24a, 24b, 24c, from the headers 17a, 17b, 17c, respectively.

Figure 6B:
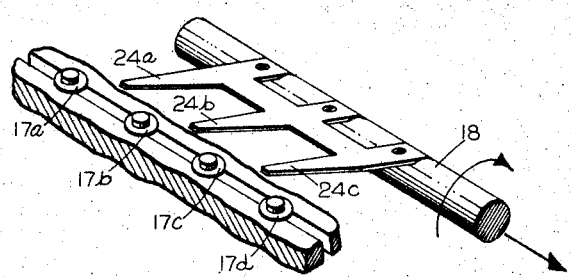
Figure 6C:
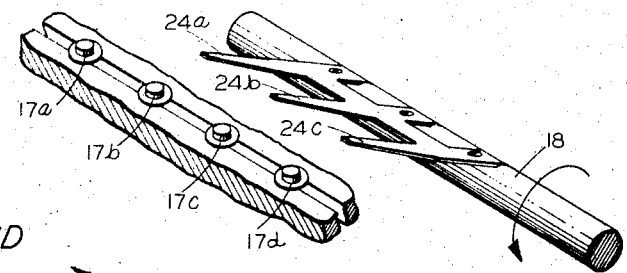
Figure 6D:
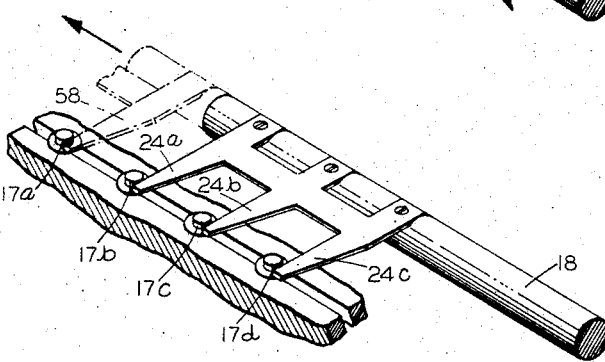

As shown in FIG. 6B, the rod 18 continues to retract while being rotated in such a direction to rotate the fingers 24a, 24b, 24c away from the transistor headers 17a, 17b, 17c, 17d. At FIG. 6C, the rod 18 has completed its linear movement to the right and is rotated to bring the fingers into proper interspersed engagement with the transistor headers and, as shown in FIG. 6D, the fingers 24a, 24b, 24c are now immediately behind the transistor headers 17b, 17c, 17d. Hence, the fingers have retracted from engagement with the headers to engagement with the immediate subsequent headers. The header 17a which was previously engaged by the finger 24a will be engaged by a finger 58, shown in phantom lines, which is further advanced on the rod 18.

In a preferred mode of operation, which is set forth generally at FIG. 5, a bonding nest occurs midstream along the path of transistors. It is understood, however, that it is immaterial whether the bonding nest is downstream, midstream, or upstream, for purposes of this invention, as this invention is primarily concerned with the feeding and transferring of devices along a path. In similar fashion, it is immaterial, for purposes of this invention, whether the guide arm is located upstream, midstream, or downstream. Likewise, the respective location of reciprocating cylinder is not essential.

In addition to transistor headers and the like, other articles having regular or irregular shapes are easily suited for feeding by the apparatus and method described herein.

Other modifications will become apparent by those skilled in the art without departing from the spirit and scope of the invention.

I claim:
1. An article feed apparatus, which comprises:
   a guideway for supporting a series of articles;
   first means having (a) a first projecting arm, and (b) a plurality of projecting feed arms for engaging individual articles of said series;
   second means, for mounting said first means for movement;
   a guide member pivotally mounted in the path of movement of said first arm;
   third means for engaging and holding said guide member at an incline to the path of movement of said first arm; and
   means for reciprocating said first means to move said first arm, during the movement in one direction of said first means, along said inclined guide member to rotate said feed arms out of engagement with said articles and then behind said inclined guide member whereafter, during the movement in the opposite direction of said first means, said first arm engages, pivots and advances past said guide member while said feed arms engage and advance said articles.

2. The apparatus as recited in claim 1 wherein said first projecting arm is a feed arm for engaging individual articles of said series.

3. An article feed apparatus, which comprises:
   a guideway for supporting a series of articles;
   a rod having (a) a first laterally projecting arm, and (b) a plurality of laterally projecting feed arms for engaging individual articles of said series;
   means for mounting said rod for axial and rotary movement;
   a guide member pivotably mounted in the path of axial movement of said first arm;
   means for engaging and holding said guide member at an incline to the path of axial movement of said first arm; and
   means for reciprocating said rod to move said first arm, during the return stroke of said rod, along said inclined guide member to rotate said feed arms out of engagement with said articles and then behind said inclined guide member whereafter, during the forward stroke of said rod, said first arm engages, pivots and advances past said guide member while all said feed arms engage and advance said articles.

4. The apparatus as recited in claim 3, wherein said first projecting arm is a feed arm for engaging individual articles of said series.

5. The apparatus as recited in claim 4, wherein said guideway is a divided track and said articles are semiconductor headers.

6. A mechanism for successively feeding a plurality of spaced-apart semiconductor headers that rest upon a divided track to a nest located downstream of the track comprising:
   a rod mounted parallel to the track for reciprocative and rotative movement,
      said rod having a plurality of fingers extending therefrom, and having an arm mounted thereon parallel to the fingers and located upstream thereof, and
      a pivotably mounted inclined lever so mounted so that upon the return stroke of the rod, said arm contacts and rides up said lever, causing an upward camming of the rod and an upward tilting of the fingers so that each of the fingers is raised above individual upstream located headers, the length of the lever being less than the strokes of said rod and less than the distance between corresponding edges of adjacent headers, and, prior to the termination of the return stroke, the arm rides off the lever and permits the individual fingers to drop behind individual spaced apart headers, and
   upon the forward stroke of the rod, the lever pivots to permit the movement of the arm thereunder while the fingers incrementally advance all the headers, the most downstream-located finger pushing its associated header into the nest.

7. The mechanism of claim 6 wherein said arm acts as a finger for incrementally advancing the headers.

8. A mechanism for successively feeding a plurality of spaced apart semiconductor headers along a divided track comprising:
   a rod mounted parallel to the track for reciprocative and rotative movement;
   said rod having a plurality of fingers extending therefrom, and having an arm mounted thereon orthogonal to the fingers, and
   a pivotably mounted inclined lever so mounted so that
      upon the return stroke of the rod, said arm that upon the return stroke of the rod, said arm contacts and rides along said lever, causing a camming of the rod and an upward tilting of the fingers so that each of the fingers is raised above individual upstream located headers, the length of the lever being less than the strokes of said rod and less than the distance between corresponding edges of adjacent headers, and, prior to the termination of the return stroke, the arm rides off the lever and permits the individual fingers to drop behind individual spaced apart headers, and
   upon the forward stroke of the rod, the lever pivots to permit the movement of the arm thereunder while the fingers incrementally advance all the headers, the most downstream located finger pushing its associated header into the nest.

9. Apparatus for feeding articles comprising:
   a guideway for supporting said articles;
   a comb-like structure having a plurality of teeth for engaging with and indexing said articles;
   means for reciprocating said structure along a direction corresponding to said guideway;
   a guide member pivotally mounted in the path of movement of, and held at an incline with, one of said teeth; and
   means for supporting said structure for rotating thereof so that
      as said structure is reciprocated in one direction, said one tooth moves up the inclined guide member to rotate the structure to bring the teeth out of engagement with the articles, and then drops behind the guide member, and
      as said structure is reciprocated in the opposite direction, said one tooth engages, pivots, and advances past the guide member while the other teeth engage and advance said articles.

10. A method of indexing and feeding a plurality of aligned articles, spaced a fixed distance apart, with a comb-like structure comprising:
   (a) bringing the comb-like structure, initially, into interleaved relation with said articles;
   (b) moving said structure in one direction, along said path, a distance sufficient to engage said articles and advance said articles said fixed distance; and
   (c) returning said structure by:
      (1) reversing the motion of said structure in the opposite direction for a short distance,
      (2) continuing in said opposite direction and rotating the structure through a positive angle to bring the teeth of the structure out of engagement with the articles, and
(3) rotating the structure through a negative angle corresponding to said positive angle, and continuing to the initial position, to again bring the structure into interleaved relation with the articles.

References Cited

UNITED STATES PATENTS 3,140,776  7/1964  Craver _____ 198—221
3,202,262  8/1965  Jones _____ 198—224

EDWARD A. SROKA, *Primary Examiner.*